(12) United States Patent
Nagalapatti et al.

(10) Patent No.: US 11,983,238 B2
(45) Date of Patent: May 14, 2024

(54) GENERATING TASK-SPECIFIC TRAINING DATA

(71) Applicant: International Business Machines Corporation, Armonk, NY (US)

(72) Inventors: Lokesh Nagalapatti, Chennai (IN); Ruhi Sharma Mittal, Bangalore (IN); Sambaran Bandyopadhyay, Hooghly (IN); Ramasuri Narayanam, Guntur (IN)

(73) Assignee: International Business Machines Corporation, Armonk, NY (US)

( * ) Notice: Subject to any disclaimer, the term of this patent is extended or adjusted under 35 U.S.C. 154(b) by 67 days.

(21) Appl. No.: 17/541,588

(22) Filed: Dec. 3, 2021

(65) Prior Publication Data

US 2023/0177110 A1  Jun. 8, 2023

(51) Int. Cl.
*G06V 10/764* (2022.01)
*G06F 18/2115* (2023.01)
(Continued)

(52) U.S. Cl.
CPC ...... *G06F 18/2115* (2023.01); *G06F 18/2148* (2023.01); *G06F 18/2431* (2023.01); *G06V 10/764* (2022.01); *G06V 40/172* (2022.01)

(58) Field of Classification Search
CPC ............ G06N 20/00; G06N 3/08; G06N 3/02; G06N 3/0475; G06N 3/0464; G06N 3/10; G06N 3/042; G06N 3/049; G06N 3/084; G06N 3/045; G06N 3/048; G06N 3/094; G10L 15/16; G10L 25/30; G06F 16/3329; G06F 18/24; G06F 16/285; G06F 30/27; G06F 16/35; G06F 40/56; G06F 40/20;
(Continued)

(56) References Cited

U.S. PATENT DOCUMENTS 7,640,470 B2   12/2009   Lammel et al.
9,224,104 B2   12/2015   Lin et al.
(Continued)

FOREIGN PATENT DOCUMENTS

WO   2007115426 A2   10/2007

OTHER PUBLICATIONS

P. Mell et al., "The NIST Definition of Cloud Computing," Recommendations of the National Institute of Standards and Technology, Special Publication 800-145, Sep. 2011, 7 pages.
(Continued)

*Primary Examiner* — Matthew C Bella
*Assistant Examiner* — Dennis Rosario
(74) *Attorney, Agent, or Firm* — Daniel Yeates; Ryan, Mason & Lewis, LLP

(57) ABSTRACT

Techniques for generating machine learning training data which corresponds to one or more downstream tasks are disclosed. In one example, a computer implemented method comprises generating one or more synthetic data instances for training a machine learning model, and determining a value of respective ones of the one or more synthetic data instances with respect to at least one task. One or more additional synthetic data instances for training the machine learning model are generated based at least in part on the values of the respective ones of the one or more synthetic data instances.

20 Claims, 5 Drawing Sheets

(51) Int. Cl.
   *G06F 18/214* (2023.01)
   *G06F 18/2431* (2023.01)
   *G06V 40/16* (2022.01)
(58) Field of Classification Search
   CPC .. G06F 40/00; G06F 16/90332; G06F 16/906;
           G06F 16/3344; G06F 18/285; G06F
           18/2433; G06F 2218/12; G06F 18/254;
           G06F 16/45; G06F 16/55; G06F 18/2115;
           G06F 18/24147; G06F 18/24155; G06F
           18/2453; G06F 18/243; G06F 18/2431;
           G06V 10/764; G06V 10/82; G06V
           10/774; G06V 20/41; G06V 10/454;
           G06V 40/172; G06V 30/19173; G06V
           20/60; G06V 20/70; G06V 30/413; G06V
           2201/08; G06V 20/698; G06V 30/18057;
           G06V 30/36; G06V 10/7753; G06V
           10/809; G06V 40/1365; G06V 30/194;
           G06V 30/2528; G06V 30/2552; G06V
           10/765; G06V 40/197; G06V 10/70;
           G06V 10/87; G06V 20/35; G06V
           30/19113; G06V 30/19153; G06T
           2207/20081; G06T 2207/20084; G06T
           3/4046; G06T 9/002; G06T 5/60; G05D
           1/0088; A61B 5/7267; A61B 5/7264
   See application file for complete search history.

(56) References Cited

U.S. PATENT DOCUMENTS

| | | | | |
|---|---|---|---|---|
| 10,990,848 | B1* | 4/2021 | Pahde | G06T 15/04 |
| 11,334,762 | B1* | 5/2022 | Wrenninge | G06F 18/214 |
| 2016/0019271 | A1 | 1/2016 | Ma et al. | |
| 2019/0080206 | A1* | 3/2019 | Hotson | G06F 18/2185 |
| 2020/0065673 | A1 | 2/2020 | Huang et al. | |
| 2020/0265259 | A1 | 8/2020 | Paul et al. | |
| 2020/0285939 | A1* | 9/2020 | Baker | G06N 3/04 |
| 2020/0356810 | A1 | 11/2020 | Zhong et al. | |
| 2021/0201003 | A1 | 7/2021 | Banerjee et al. | |
| 2021/0339772 | A1* | 11/2021 | Ramamoorthy | G08G 1/0116 |
| 2022/0122001 | A1* | 4/2022 | Choe | G06N 20/20 |

OTHER PUBLICATIONS

W. Monroe, "Bernoulli and Binomial Random Variables," CS 109, Based on a chapter by Chris Piech, Lecture Notes #7, Jul. 10, 2017, 2 pages.
J. Brownlee, "A Gentle Introduction to Generative Adversarial Networks (GANs)" https://machinelearningmastery.com/what-are-generative-adversarial-networks-gans/, Jul. 19, 2019, 29 pages.
Wikipedia, "Empirical Risk Minimization," https://en.wikipedia.org/w/index.php? title=Empirical_risk_minimization&oldid=1051628131, Oct. 24, 2021, 3 pages.
J. Peters, "Policy Gradient Methods," www.scholarpedia.org/article/Policy_gradient_methods, Oct. 12, 2010, 10 pages.
J. Hui, "RL—Policy Gradient Explained," https://jonathan-hui.medium.com/rl-policy-gradients-explained-9b13b688b146, Sep. 12, 2018, 14 pages.
myaccountingcourse.com, "What is and F1 Score?" https://www.myaccountingcourse.com/accounting-dictionary/f1-score, Accessed Nov. 18, 2021, 4 pages.
Google., "Generative Adversarial Networks—Introduction," https://developers.google.com/machine-learning/gan, Accessed Dec. 3, 2021, 2 pages.

* cited by examiner

GENERATING TASK-SPECIFIC TRAINING DATA

BACKGROUND

In order to train a machine learning model, training data is provided to a learning algorithm of the machine learning model. The learning algorithm determines patterns in the training data that correlate input data features with predictions to be made by the machine learning model. The machine learning model makes predictions based on inputted data for which answers may be sought. Accordingly, the type of training data is important to the success of the machine learning model.

SUMMARY

Embodiments of the invention provide techniques to generate machine learning training data which corresponds to one or more downstream tasks.

In one illustrative embodiment, a computer implemented method comprises generating one or more synthetic data instances for training a machine learning model, and determining a value of respective ones of the one or more synthetic data instances with respect to at least one task. One or more additional synthetic data instances for training the machine learning model are generated based at least in part on the values of the respective ones of the one or more synthetic data instances.

Further illustrative embodiments are provided in the form of a computer program product comprising a non-transitory computer readable storage medium having embodied therein executable program code that when executed by a processor causes the processor to perform the above computer implemented method. Still further illustrative embodiments comprise an apparatus or system with a processor and a memory configured to perform the above computer implemented method.

These and other features and advantages of embodiments described herein will become more apparent from the accompanying drawings and the following detailed description.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass a wide variety of processing systems, by way of example only, processing systems comprising cloud computing and storage systems as well as other types of processing systems comprising various combinations of physical and/or virtual processing resources.

As mentioned above in the background section, the type of training data used to train a machine learning model is important to the success of the machine learning model. In some instances, training datasets for machine learning applications may be problematic. For example, under conventional approaches, synthetic training data has a variety of limitations including being task agnostic and not accounting for constraints.

The embodiments advantageously provide techniques for the development of a framework for the automated generation of high value training data specifically tailored to one or more downstream tasks. Unlike current approaches, when generating training data, the embodiments take into account any downstream tasks for which the machine learning model output will be used. As an additional advantage, the embodiments allow for the incorporation of one or more user-defined constraints into the process for generating training data in order to preserve properties such as, for example, class balance and fairness.

Figure 1:
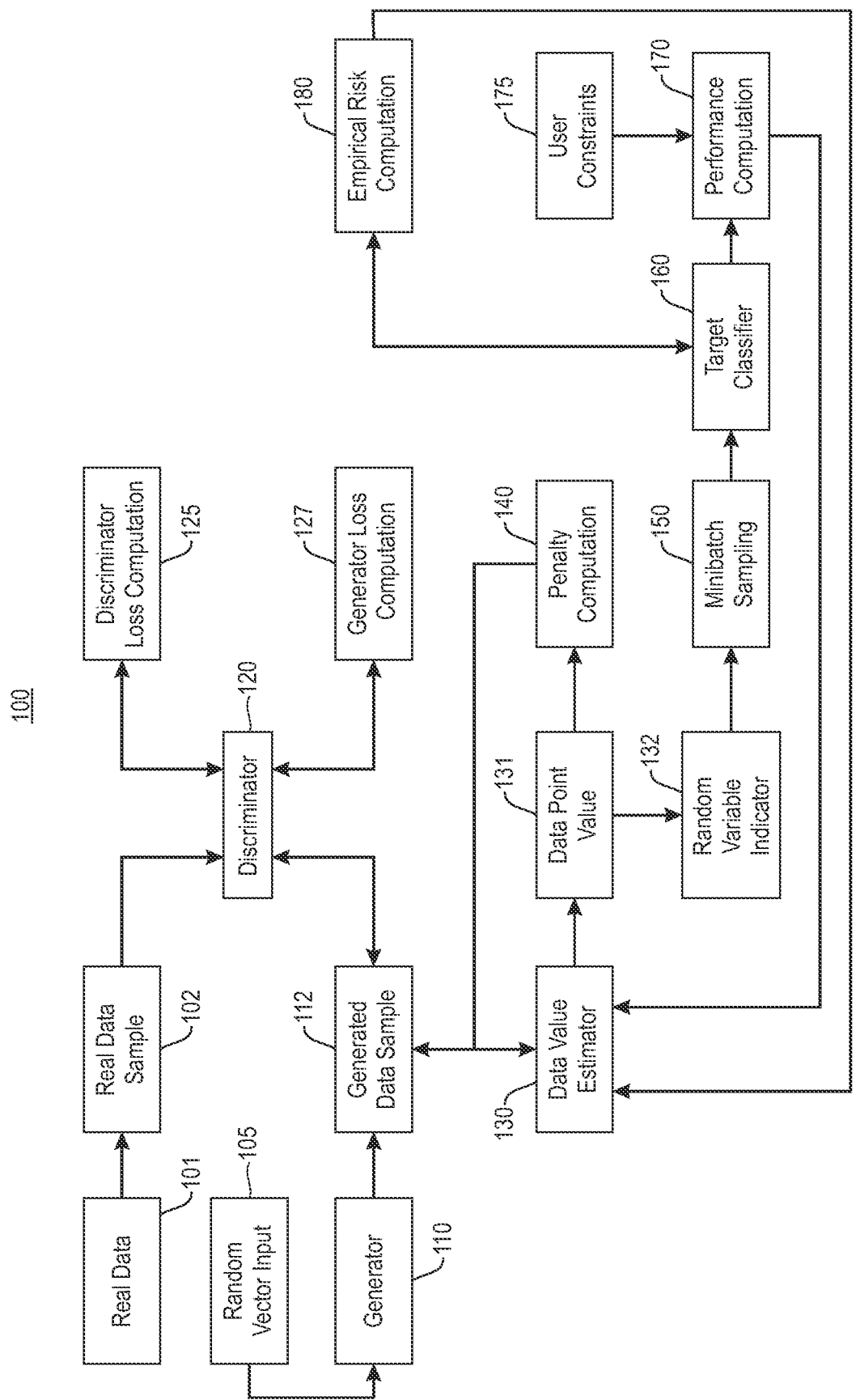
FIG. 1 illustrates a system for generating machine learning training data according to an illustrative embodiment.

FIG. 1 depicts a system 100 for generating machine learning training data according to an illustrative embodiment. As shown in FIG. 1 by lines and/or arrows, the components of the system 100 are operatively connected to each other via, for example, physical connections, such as wired and/or direct electrical contact connections, and/or wireless connections, such as, for example, WiFi, BLUETOOTH, IEEE 802.11, and/or other networks, including but not limited to, a local area network (LAN), wide area network (WAN), cellular network, ad hoc networks (e.g., wireless ad hoc network (WANET)), satellite network or the Internet. For example, a network can operatively link a generator 110, discriminator 120, data value estimator 130 and other components of the system 100 to each other.

The system 100 comprises a generative adversarial network (GAN) comprising, example, the generator 110, the discriminator 120, a discriminator loss computation layer 125 and a generator loss computation layer 127. The GAN is a deep-learning-based generative model to produce data for training a machine learning model. The generator 110 uses machine learning techniques to synthesize training data from a random vector input 105. For example, the random vector input 105 comprises a fixed-length random vector randomly drawn from a Gaussian distribution, which is used to seed a generative process. The discriminator 120 takes as input real data samples 102 from real data 101 and generated (e.g., synthetic) data samples 112 created by the generator 110. The discriminator 120 uses machine learning techniques to classify whether the samples 102 and 112 are real (e.g., from a given domain) or synthetic (e.g., fake), generated by the generator 110. The data samples 102 and 112 may comprise, for example, images, text (e.g., natural language), word sequences or other formats.

In general, the generator 110 learns to generate data that will be perceived as real, and the discriminator 120 learns to distinguish between data synthesized by the generator 110 and real data. For example, the discriminator loss and generator loss computation layers 125 and 127 evaluate the classifications of the data samples 102 and 112 by the discriminator 120 using loss functions based on points of view of the discriminator 120 and the generator 110, respectively. More specifically, a loss function used by the discriminator loss computation layer 125 computes a penalty for misclassification by the discriminator 120 of a synthetic data instance as a real data instance, and a loss function used by the generator loss computation layer 127 computes a penalty for correct classification by the discriminator 120 of a synthetic data instance as a synthetic data instance. The penalty for misclassification by the discriminator 120 means that the discriminator 120 is classifying fake data as real, which can be the result of the generator 110 producing better (e.g., more realistic) samples 112. The discriminator 120 updates the weights of its learning algorithm through backpropagation from the output of the discriminator loss computation layer 125. The penalty for correct classification by the discriminator 120 of a synthetic data instance means that the generator 110 still needs to improve its data sample generation to produce better (e.g., more realistic) samples 112 that can cause the discriminator 120 to mischaracterize a sample 112. The generator 110 updates the weights of its learning algorithm through backpropagation from the output of the generator loss computation layer 127. As training progresses, the ability of the generator 110 to produce a sample 112 that can fool the discriminator 120 increases. In one or more embodiments, the generator 110 and the discriminator 120 comprise neural networks. The loss functions employed by the discriminator loss and generator loss computation layers 125 and 127 include, but are not necessarily limited to, minimax and/or Wasserstein loss functions.

As shown in FIG. 1, the generated data samples 112 are also input to a data value estimator 130. The data value estimator 130 uses one or more machine learning techniques to learn how to predict which samples 112 will have a high-value with respect to one or more downstream tasks while also fulfilling one or more constraints such as, for example, class balance, fairness, outliers and/or noise. When there are multiple classes in a dataset, class balance refers to approximately the same proportion of each class in the dataset. In a non-limiting example, assuming a dataset of 100 images comprising images of dogs and cats respectively labelled as "cat" or "dog", "cat" and "dog" are classes in the dataset. If there are 90 cat images and 10 dog images, then the dataset is imbalanced. To balance the dataset, various strategies may be employed. For example, in one approach, a number of cat images equal to the number of dog images (in this case 10 cat images) are selected, and the 10 selected cat images and 10 dog images are considered a dataset. In another approach, dog images required to equal the number of cat images (in this case 80 dog images) are collected and/or synthesized to balance the data. Fairness refers to a dataset not being biased with respect to one or more given attributes including, but not necessarily limited to, demographic attributes of members of a dataset.

Conventional approaches for the generation of data are not task-aware, failing to take into account the task for which the data is to be used (e.g., animal species classification, vehicle classification, document classification, illness classification, building classification, email (e.g., spam, not spam) classification, etc.). The embodiments determine the value of the generated data samples 112 with respect to downstream tasks to build a classifier that will result in high-value data for a given task. Some non-limiting examples of downstream tasks include, for example, classification tasks as noted above (e.g., given an image the system has to classify the image into a class), clustering tasks, and prediction tasks.

According to one or more embodiments, the data value estimator 130 employs a continuous, gradient friendly function, which estimates the value of respective ones of generated data samples 112 with respect to one or more downstream tasks. For example, in or more embodiments, the data point (e.g., data instance) value 131 comprises a Bernoulli random variable (R.V.) having one of two values, 1 and 0 ($v \in [0, 1]$), where a value of 1 represents a high-value (e.g., successful) sample with respect to the task and a value of 0 represents a low-value (e.g., unsuccessful sample) with respect to the task. An objective of the system is to produce samples 112 that would be rated by the data value estimator 130 as high-value (e.g., at or near 1). A penalty computation layer 140 penalizes the generator 110 for producing a low-value sample (e.g., at or near 0). In an embodiment, the penalty is calculated according to the following formula: Valuation loss=$-\log (v)$. If $v=1$, the penalty is 0 and a gradient is also 0. If $v=0$, the penalty is $\infty$. The objective is to reach an equilibrium, where the generator 110 generates realistic samples 112 based on training from classification by the discriminator and the generator loss computation layer 127, and high-valued data samples 112 based on training of the data value estimator 130.

In one or more embodiments, a subset of respective ones of the data samples 112 (e.g., data instances) having a predetermined value with respect to at least one task (e.g., 1 or close to 1 (over a predetermined threshold)) is selected. A random variable indicator 132 indicates whether a sample 112 has been selected or not selected ($I_{selected}$). A minibatch sampling layer 150 manages the selected subset for a given iteration. A target classifier 160 is trained with the selected subsets based at least in part on computed performance by a performance computation layer 170 and computed empirical risk by an empirical risk computation layer 180. The computed performance and empirical risk is provided as feedback to the data value estimator 130. The computed performance and empirical risk can also be provided as feedback to the target classifier 160.

For a given iteration, the performance computation layer 170 computes the performance of a model for generating the samples 112 based on the selected subset with respect to a given task, and computes a difference between the performance of the model corresponding to the subset and the performance of the model in connection with a full validation dataset of samples 112 with respect to a given task. The embodiments are configured to maximize the difference (e.g., maximize a reward) using one or more policy gradients based on reinforced learning (RL) methods.

In one or more embodiments, the difference is represented as Perf(selected)−Perf(Full), and more specifically, as Pert (D)=Perf ($f_\theta$, Dv); where $\theta = \text{argmin}_\theta \Sigma_{(x,y) \in D} l(f(x, \theta), y)$; and Dv=validation dataset. Perf(selected)−Perf(Full) refers to the performance of the model trained with a selected subset of validation data samples minus the performance of the model trained with full set of validation data samples. In the event of poor performance of the model trained with the selected subset of validation data samples, then Perf(selected) will be less than Perf(full), resulting in a negative reward. In the event of high performance of the model trained with the selected subset of validation data samples, then Perf(selected) will be greater than Perf(full), resulting in a positive reward. The reward is sent to the data value estimator 130, which uses policy gradients from RL to update the parameters of the data value estimator 130.

The maximized reward using the policy gradients is fed back to the data value estimator 130. As a result, the target classifier 160 is trained on samples selected using the data value estimator 130 that are superior to the complete data. According to the embodiments, the performance is measured on a holdout (e.g., test) dataset using, for example, such metrics as F1 score, area under the receiver operating characteristic (AUROC), accuracy and imbalance. In one or more embodiments, the holdout set is essentially noise free.

The data value estimator 130 is trained based on the maximized reward using policy gradients, to predict which data samples 112 have high value. The top high valued points are selected as the data sample subset.

The empirical risk computation layer 180 computes the empirical risk for the subset of the data samples, and the embodiments are configured to minimize the empirical risk in connection with the training of the target classifier 160.

According to one or more embodiments, one or more user constraints 175 are factored into the performance calculation. As noted herein, the one or more constraints comprise, for example, class balance, fairness, outliers and/or noise. A user can be provided with an interface to incorporate the user constraints 175 in a plug and play manner. In an embodiment, the user constraints 175 are factored into training by the data value estimator 130. In more detail, the performance computation layer 170 calculates a reward using an algorithm which accounts for data point value 131 and plug-in factors (e.g., user constraints 175). The computed reward is input to the data value estimator 130, which uses the computed reward for training so that in a subsequent iteration, the accuracy of the data point value 130 will increase.

Figure 2:
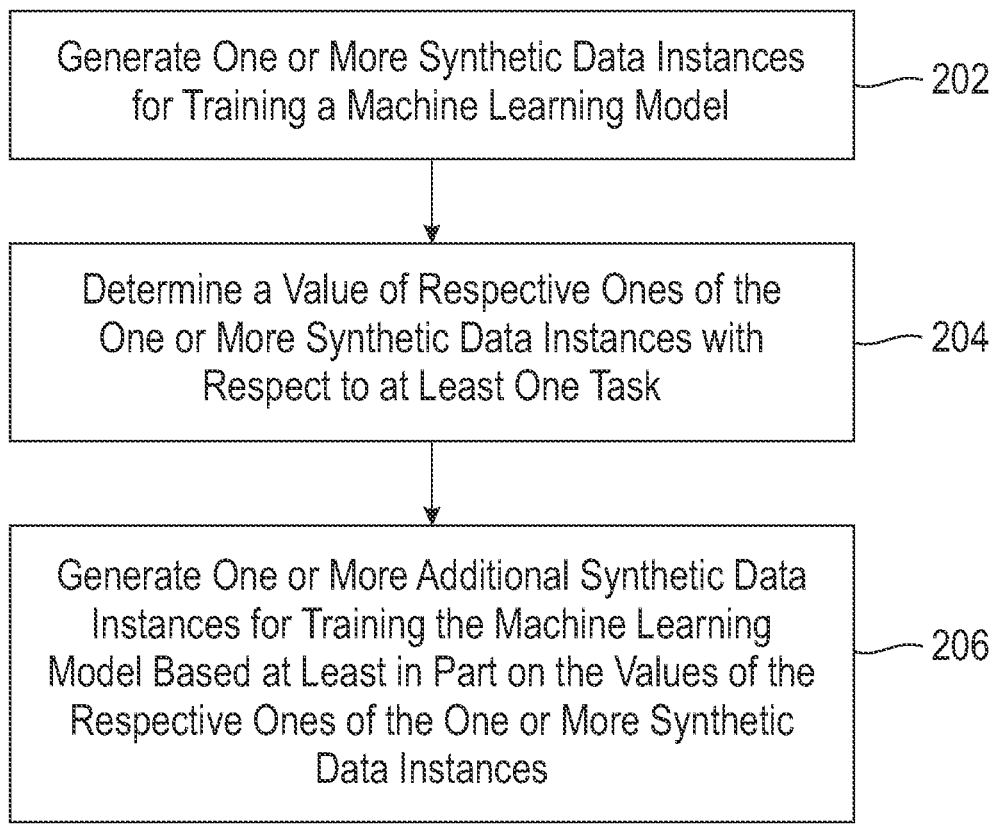
FIG. 2 illustrates a training data generation process flow according to an illustrative embodiment.

Taking into account the above and other features described herein, FIG. 2 illustrates a training data generation methodology 200 to generate high-value data points specific to one or more downstream tasks.

In step 202, one or more synthetic data instances for training a machine learning model are generated. In step 204, a value of respective ones of the one or more synthetic data instances is determined with respect to at least one task. In step 206, one or more additional synthetic data instances for training the machine learning model are generated based at least in part on the values of the respective ones of the one or more synthetic data instances. For example, as a result of maximizing a reward for a subset of data samples with respect to a given task, additional data samples are generated by a generator 110 in subsequent iterations which are an improvement over previous data samples 112.

In the method, the respective ones of the one or more synthetic data instances are also classified as being one of a real data instance and a synthetic data instance. The generation of the one or more additional synthetic data instances is further based at least in part on the classification of the respective ones of the one or more data instances. The classification of the respective ones of the one or more data instances is evaluated using at least one loss function. The at least one loss function computes a penalty for misclassification of a given one of the one or more synthetic data instances as a real data instance, and/or computes a penalty for correct classification of a given one of the one or more synthetic data instances as a synthetic data instance.

In one or more embodiments, respective penalties are computed based at least in part on the values of the respective ones of the one or more synthetic data instances. A machine learning classifier (e.g., target classifier 160) is trained with a subset of the respective ones of the one or more synthetic data instances having a predetermined value with respect to the at least one task.

Performance of the subset of the respective ones of the one or more synthetic data instances is computed with respect to the at least one task. Additionally, a difference between the performance of the subset of the respective ones of the one or more synthetic data instances and a performance of a full set of the respective ones of the one or more synthetic data instances with respect to the at least one task is computed. Through, for example, iterative training, the system 100 maximizes the difference using one or more policy gradients. An empirical risk for the subset of the respective ones of the one or more synthetic data instances is computed, and through, for example, iterative training, the system minimizes the empirical risk.

The generation of the one or more additional synthetic data instances is further based at least in part on one or more user-defined constraints comprising, for example, class balance and/or fairness.

The techniques depicted in FIGS. 1-2 can also, as described herein, include providing a system, wherein the system includes distinct software modules, each of the distinct software modules being embodied on a tangible computer readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer readable recordable storage medium with code adapted to be executed to carry out at least one method step described herein, including the provision of the system with the distinct software modules.

Additionally, the techniques depicted in FIGS. 1-2 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 3:
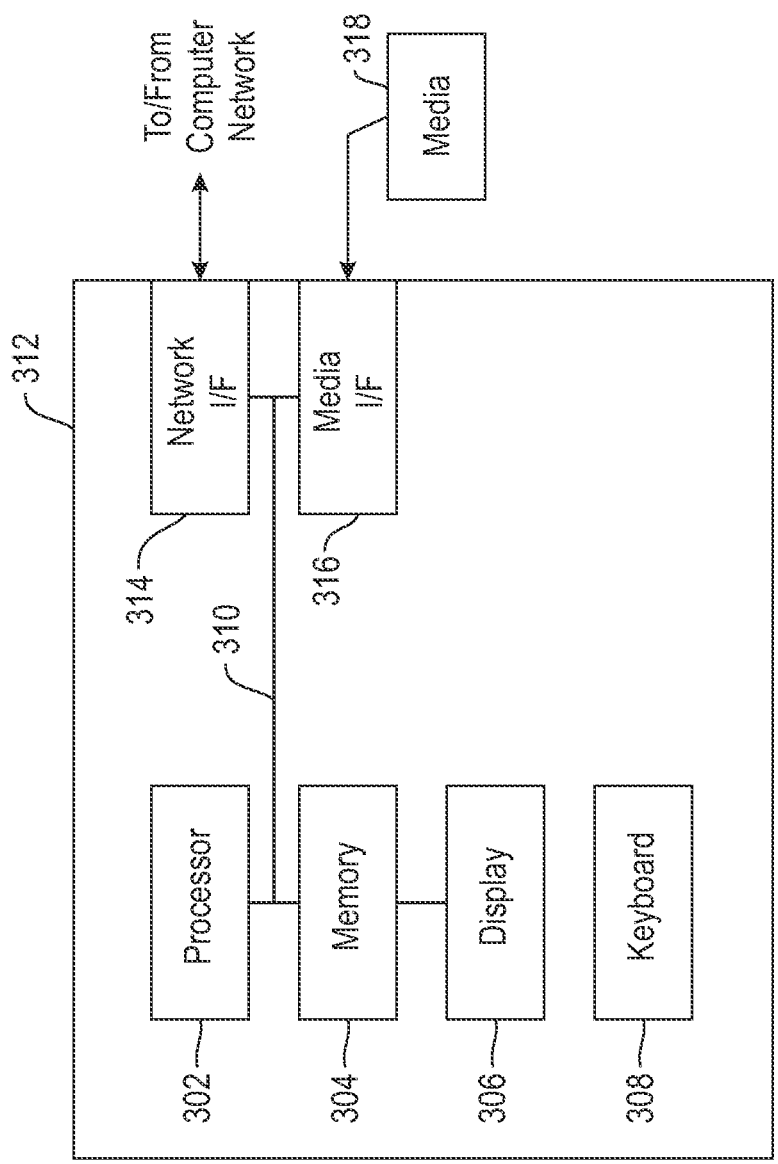
FIG. 3 illustrates an exemplary information processing system according to an illustrative embodiment.

Additionally, an embodiment of the present invention can make use of software running on a computer or workstation. With reference to FIG. 3, such an implementation might employ, for example, a processor 302, a memory 304, and an input/output interface formed, for example, by a display 306 and a keyboard 308. The term "processor" as used herein is intended to include any processing device, such as, for example, one that includes a multi-core CPU, GPU, FPGA and/or other forms of processing circuitry such as one or more ASICs. Further, the term "processor" may refer to more than one individual processor. The term "memory" is intended to include memory associated with a processor (e.g., CPU, GPU, FPGA, ASIC, etc.) such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 302, memory 304, and input/output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of embodiments of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 302 coupled directly or indirectly to memory elements 304 through a system bus 310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 312 as shown in FIG. 3) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 302. Further, a computer program product can include a computer readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICs), functional circuitry, an appropriately programmed digital computer with associated memory, and the like. Given the teachings of the invention provided herein, one of ordinary skill in the related art will be able to contemplate other implementations of the components of the invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
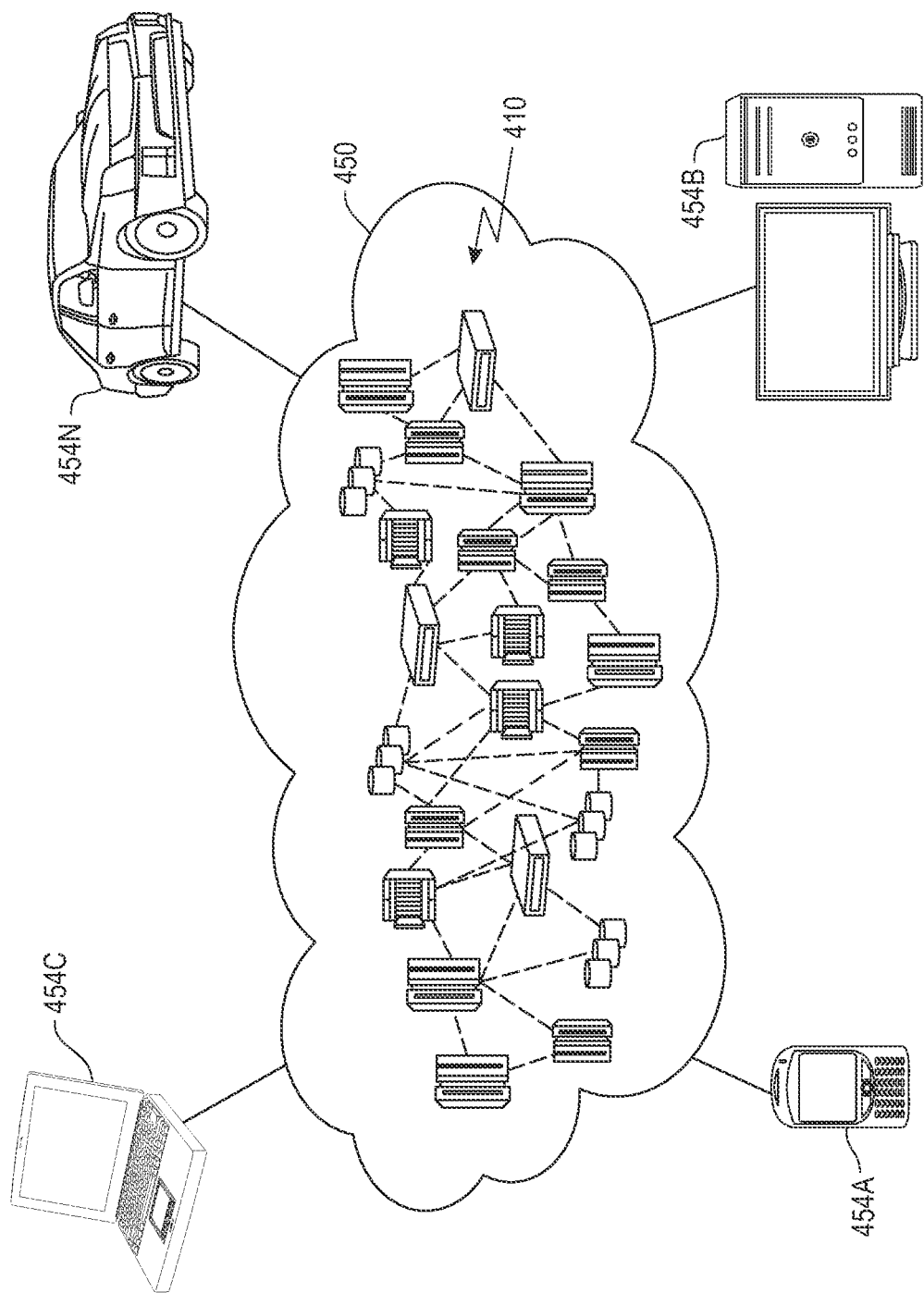
FIG. 4 illustrates a cloud computing environment according to an illustrative embodiment.

Referring now to FIG. 4, illustrative cloud computing environment 450 is depicted. As shown, cloud computing environment 450 includes one or more cloud computing nodes 410 with which local computing devices used by cloud consumers, such as, for example, personal digital assistant (PDA) or cellular telephone 454A, desktop computer 454B, laptop computer 454C, and/or automobile computer system 454N may communicate. Nodes 410 may communicate with one another. They may be grouped (not shown) physically or virtually, in one or more networks, such as Private, Community, Public, or Hybrid clouds as described hereinabove, or a combination thereof. This allows cloud computing environment 450 to offer infrastructure, platforms and/or software as services for which a cloud consumer does not need to maintain resources on a local computing device. It is understood that the types of computing devices 454A-N shown in FIG. 4 are intended to be illustrative only and that computing nodes 410 and cloud computing environment 450 can communicate with any type of computerized device over any type of network and/or network addressable connection (e.g., using a web browser).

Figure 5:
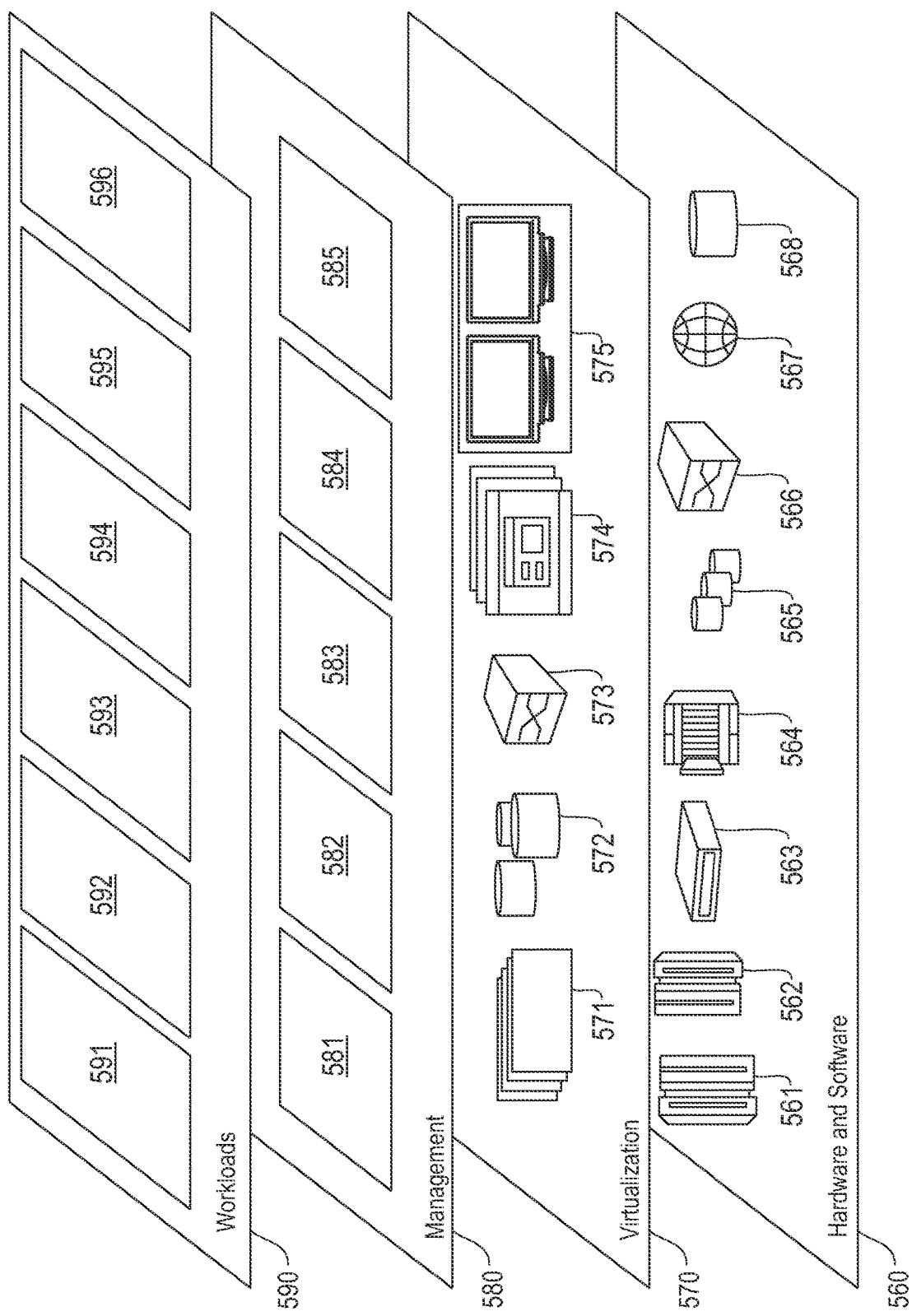
FIG. 5 illustrates abstraction model layers according to an illustrative embodiment.

Referring now to FIG. 5, a set of functional abstraction layers provided by cloud computing environment 450 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 560 includes hardware and software components. Examples of hardware components include: mainframes 561; RISC (Reduced Instruction Set Computer) architecture-based servers 562; servers 563; blade servers 564; storage devices 565; and networks and networking components 566. In some embodiments, software components include network application server software 567 and database software 568.

Virtualization layer 570 provides an abstraction layer from which the following examples of virtual entities may be provided: virtual servers 571; virtual storage 572; virtual networks 573, including virtual private networks; virtual applications and operating systems 574; and virtual clients 575. In one example, management layer 580 may provide the functions described below. Resource provisioning 581 provides dynamic procurement of computing resources and other resources that are utilized to perform tasks within the cloud computing environment. Metering and Pricing 582 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 583 provides access to the cloud computing environment for consumers and system administrators. Service level management 584 provides cloud computing resource allocation and management such that required service levels are met. Service Level Agreement (SLA) planning and fulfillment 585 provide pre-arrangement for, and procurement of, cloud computing resources for which a future requirement is anticipated in accordance with an SLA.

Workloads layer 590 provides examples of functionality for which the cloud computing environment may be utilized. Examples of workloads and functions which may be provided from this layer include: mapping and navigation 591; software development and lifecycle management 592; virtual classroom education delivery 593; data analytics processing 594; transaction processing 595; and data instance generation 596, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, a framework (e.g., a set of one or more framework configurations) for generating high-value realistic data for a specific downstream task and simultaneously fulfilling one or more user-defined constraints. The embodiments advantageously incorporate the value of data to a downstream task into the data synthesis method, so the automatically generated data samples have a high value with respect to a given task, and also satisfy one or more user-defined constraints such as, for example, class balance and fairness.

The embodiments advantageously provide machine learning techniques to configure a generator of a GAN to generate task-aware synthetic data, while maintaining realistic data samples, and satisfying plug and play user-defined constraints.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product comprising a computer readable storage medium having program instructions embodied therewith, the program instructions executable by one or more processors to cause the one or more processors to:
generate, using a first machine learning model, one or more synthetic data instances for training a target machine learning classifier;
input the one or more synthetic data instances to a neural network, wherein the neural network classifies whether respective ones of the one or more synthetic data instances are one of a synthetic data instance and a real data instance;
identify whether the classifications of the respective ones the one or more synthetic data instances are correct;
evaluate the classifications of the respective ones of the one or more synthetic data instances using a first loss function and a second loss function;
update weights applied in a learning algorithm used by the neural network based on an output of the first loss function;
train the first machine learning model based at least in part on whether the classifications of the respective ones of the one or more synthetic data instances are correct, wherein in training the first machine learning model, the program instructions cause the one or more processors to update weights applied in a learning algorithm used by the first machine learning model based on an output of the second loss function;
determine, using a second machine learning model, values of respective ones of the one or more synthetic data instances with respect to at least one task; and
generate a subset of the one or more synthetic data instances for use in the training of the target machine learning classifier, wherein the generation of the subset is based at least in part on the values of respective ones of the one or more synthetic data instances with respect to the at least one task.

2. The computer program product of claim 1, wherein the program instructions further cause the one or more processors to generate one or more additional synthetic data instances for training the target machine learning classifier based at least in part on the classification of the respective ones of the one or more synthetic data instances.

3. The computer program product of claim 2, wherein the generation of the one or more additional synthetic data instances is further based at least in part on one or more user-defined constraints.

4. The computer program product of claim 3, wherein the one or more user-defined constraints comprise at least one of class balance and fairness.

5. The computer program product of claim 1, wherein the first loss function computes a penalty for misclassification of a given one of the one or more synthetic data instances as a real data instance.

6. The computer program product of claim 1, wherein the second loss function computes a penalty for correct classification of a given one of the one or more synthetic data instances as a synthetic data instance.

7. The computer program product of claim 1, wherein the program instructions further cause the one or more processors to compute respective penalties based at least in part on the values of the respective ones of the one or more synthetic data instances.

8. The computer program product of claim 1, wherein the program instructions further cause the one or more processors to train the target machine learning classifier with the subset of the respective ones of the one or more synthetic data instances, wherein each synthetic data instance in the subset has been determined to have at least a predetermined threshold value with respect to the at least one task.

9. The computer program product of claim 8, wherein the program instructions further cause the one or more processors to compute a performance of the target machine learning classifier when trained with the subset of the respective ones of the one or more synthetic data instances.

10. The computer program product of claim 9, wherein the program instructions further cause the one or more processors to compute a difference between the performance of the target machine learning classifier when trained with the subset of the respective ones of the one or more synthetic data instances and a performance of the target machine learning classifier when trained with a full set of the respective ones of the one or more synthetic data instances with respect to the at least one task.

11. The computer program product of claim 10, wherein the program instructions further cause the one or more processors to maximize the difference using one or more policy gradients.

12. The computer program product of claim 8, wherein the program instructions further cause the one or more processors to compute an empirical risk for the subset of the respective ones of the one or more synthetic data instances.

13. The computer program product of claim 12, wherein the program instructions further cause the one or more processors to minimize the empirical risk.

14. A computer implemented method, comprising:
generating, using a first machine learning model, one or more synthetic data instances for training a target machine learning classifier;
inputting the one or more synthetic data instances to a neural network, wherein the neural network classifies whether respective ones of the one or more synthetic data instances are one of a synthetic data instance and a real data instance;
identifying whether the classifications of the respective ones of the one or more synthetic data instances are correct;
evaluating the classifications of the respective ones of the one or more synthetic data instances using a first loss function and a second loss function;
updating weights applied in a learning algorithm used by the neural network based on an output of the first loss function;
training the first machine learning model based at least in part on whether the classifications of the respective ones of the one or more synthetic data instances are correct, wherein the training comprises updating weights applied in a learning algorithm used by the first machine learning model based on an output of the second loss function;
determining, using a second machine learning model, values of respective ones of the one or more synthetic data instances with respect to at least one task; and
generating a subset of the one or more synthetic data instances for use in the training of the target machine learning classifier, wherein the generation of the subset is based at least in part on the values of respective ones of the one or more synthetic data instances with respect to the at least one task;

wherein the computer implemented method is performed by at least one processing device comprising a processor coupled to a memory executing program code.

15. The computer implemented method of claim 14, further comprising training the target machine learning classifier with the subset of the respective ones of the one or more synthetic data instances, wherein each synthetic data instance in the subset has been determined to have at least a predetermined threshold value with respect to the at least one task.

16. The computer implemented method of claim 15, further comprising computing a performance of the target machine learning classifier when trained with the subset of the respective ones of the one or more synthetic data instances.

17. An apparatus comprising:
  at least one processing device comprising a processor coupled to a memory, the at least one processing device, when executing program code, is configured to:
  generate, using a first machine learning model, one or more synthetic data instances for training a target machine learning classifier;
  input the one or more synthetic data instances to a neural network, wherein the neural network classifies whether respective ones of the one or more synthetic data instances are one of a synthetic data instance and a real data instance;
  identify whether the classifications of the respective ones of the one or more synthetic data instances are correct;
  evaluate the classifications of the respective ones of the one or more synthetic data instances using a first loss function and a second loss function;
  update weights applied in a learning algorithm used by the neural network based on an output of the first loss function;
  train the first machine learning model based at least in part on whether the classifications of the respective ones of the one or more synthetic data instances are correct, wherein in training the first machine learning model, the at least one processing device is configured to update weights applied in a learning algorithm used by the first machine learning model based on an output of the second loss function;
  determine, using a second machine learning model, values of respective ones of the one or more synthetic data instances with respect to at least one task; and
  generate a subset of the one or more synthetic data instances for use in the training of the target machine learning classifier, wherein the generation of the subset is based at least in part on the values of respective ones of the one or more synthetic data instances with respect to the at least one task.

18. The apparatus of claim 17, wherein the at least one processing device, when executing the program code, is further configured to train the target machine learning classifier with the subset of the respective ones of the one or more synthetic data instances, wherein each synthetic data instance in the subset has been determined to have at least a predetermined threshold value with respect to the at least one task.

19. The apparatus of claim 17, wherein the at least one processing device, when executing the program code, is further configured to generate one or more additional synthetic data instances for training the target machine learning classifier based at least in part on the classification of the respective ones of the one or more synthetic data instances.

20. The apparatus of claim 19, wherein the generation of the one or more additional synthetic data instances is further based at least in part on one or more user-defined constraints.

\* \* \* \* \*